(12) United States Patent
Barney et al.

(10) Patent No.: US 9,548,866 B2
(45) Date of Patent: *Jan. 17, 2017

(54) DELETION OF CONTENT IN DIGITAL STORAGE SYSTEMS

(71) Applicant: International Business Machines Corporation, Armonk, NY (US)

(72) Inventors: Jonathan M. Barney, Poughkeepsie, NY (US); David Lebutsch, Tuebingen (DE); Cataldo Mega, Tuebingen (DE); Stefan Schleipen, Herrenberg (DE); Tim Waizenegger, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/046,673

(22) Filed: Feb. 18, 2016

(65) Prior Publication Data

US 2016/0164683 A1 Jun. 9, 2016

Related U.S. Application Data

(63) Continuation of application No. 14/547,940, filed on Nov. 19, 2014, now Pat. No. 9,298,951.

(30) Foreign Application Priority Data

Nov. 20, 2013 (GB) .................................. 1320459.9

(51) Int. Cl.
*H04L 29/06* (2006.01)
*H04L 9/32* (2006.01)
(Continued)

(52) U.S. Cl.
CPC ......... *H04L 9/3242* (2013.01); *G06F 12/1408* (2013.01); *G06F 21/6218* (2013.01);
(Continued)

(58) Field of Classification Search
CPC .................. G06F 21/6218; G06F 21/78; G06F 2221/2143; H04L 9/3242
See application file for complete search history.

(56) References Cited

U.S. PATENT DOCUMENTS 7,171,557 B2 * 1/2007 Kallahalla ........... G06F 21/6218
380/277
7,284,107 B2 * 10/2007 Willman ............. G06F 12/1416
711/170

(Continued)

FOREIGN PATENT DOCUMENTS

WO 2013088282 A1 6/2013

OTHER PUBLICATIONS

Roche et al., "A Practical Oblivious Map Data Structure with Secure Deletion and History Independence", Retrieved from https://eprint.iacr.org/2015/1126.pdf, Published Nov. 2015.*

(Continued)

*Primary Examiner* — Chau Le
(74) *Attorney, Agent, or Firm* — Patterson + Sheridan, LLP (57) ABSTRACT

A data processing and storage apparatus has a hardware security module and a data storage medium storing encrypted data objects and a hierarchical data maintenance structure of encrypted partition tables and hash-nodes forming a rooted tree, where a given partition table comprises a first reference to a given encrypted data object and a first cryptographic key for decryption thereof, where a given hash-node comprises a second reference to a partition tables or hash-node and a second cryptographic key being suitable (Continued)

for decryption thereof, and where the root node is decipherable using a master cryptographic key stored in the hardware security module, the given data object being assigned to the root node via the first and second references of the given partition table and the given hash-nodes forming a set of successive nodes in the rooted tree.

20 Claims, 4 Drawing Sheets

(51) Int. Cl.
*G06F 21/78* (2013.01)
*G06F 21/62* (2013.01)
*G06F 12/14* (2006.01)
*H04L 9/14* (2006.01)

(52) U.S. Cl.
CPC ............ *G06F 21/78* (2013.01); *H04L 9/14* (2013.01); *G06F 2212/1052* (2013.01); *G06F 2221/2143* (2013.01); *H04L 2209/24* (2013.01)

(56) References Cited

U.S. PATENT DOCUMENTS

| | | | |
|---|---|---|---|
| 7,404,006 B1 | 7/2008 | Slaughter et al. | |
| 7,646,867 B2* | 1/2010 | Plotkin | G06F 21/62 380/28 |
| 7,730,327 B2* | 6/2010 | Plotkin | H04L 9/0891 713/193 |
| 8,224,935 B1 | 7/2012 | Bandopadhyay et al. | |
| 8,300,823 B2* | 10/2012 | Bojinov | G06F 3/0608 380/269 |
| 8,397,083 B1 | 3/2013 | Sussland et al. | |
| 8,429,420 B1 | 4/2013 | Melvin | |
| 8,433,901 B2 | 4/2013 | De Atley et al. | |
| 2003/0037248 A1 | 2/2003 | Launchbury et al. | |
| 2005/0018853 A1 | 1/2005 | Lain et al. | |
| 2007/0226809 A1 | 9/2007 | Ellard | |
| 2008/0109395 A1 | 5/2008 | Loeb | |
| 2009/0046862 A1 | 2/2009 | Ito et al. | |
| 2009/0282048 A1* | 11/2009 | Ransom | G06F 17/30094 |
| 2010/0110935 A1 | 5/2010 | Tamassia et al. | |
| 2012/0093318 A1 | 4/2012 | Obukhov et al. | |
| 2013/0024687 A1 | 1/2013 | Lumb | |
| 2014/0237231 A1 | 8/2014 | Spalka et al. | |

OTHER PUBLICATIONS

Pinkas et al., "A Simple Recursive Tree Oblivious RAM", Retrieved from https://eprint.iacr.org/2014/418.pdf, Published Jun. 2014.*
Search Report for British Application No. GB1320459.9, dated Apr. 28, 2014.
Reardon et al.; "SOK: Secure Data Deletion;" May 19-22, 2013; http://ieeexplore.ieee.org/xpl/article Details.jsp? tp= &searchWithin%DSecure+Deletion%26queryText%DDelete.
Castiglione et al.; "Automatic, Selective and Secure Deletion of Digital Evidence;" Oct. 26-28, 2011; http://ieeexploreieee.org/xpl/articleDetails.?tp=&amumber=6103064 &searchWithin%3DSecure+Deletion%26queryText%2DDelete.

* cited by examiner

DELETION OF CONTENT IN DIGITAL STORAGE SYSTEMS

CROSS-REFERENCE TO RELATED APPLICATIONS

This application is a continuation of co-pending U.S. patent application Ser. No. 14/547,940, filed Nov. 19, 2014, which itself claims priority to a British application 1320459.9 filed on date. Nov. 20, 2013. The aforementioned patent applications are incorporated by reference in their entirety.

FIELD OF INVENTION

The invention relates to the field of computer science, and more particularly the invention relates to a data processing and storage apparatus, a method for operating a data processing and storage apparatus and to computer executable instructions on a computer-readable non-transitory storage medium for storing encrypted data objects in connection with a data maintenance structure providing for manageable plain-text access to these encrypted data objects.

BACKGROUND

Secure deletion of content is a business requirement today in the context of defensible disposal. Defensible disposal of business records is a business process where a business entity can prove (in court) that it expunged certain records while meeting its legal obligations (records management). If the records were not truly expunged (securely deleted) the court could order the retrieval of these records through forensic methods.

Numerous known solutions provide for secure data deletion based on physically destructing storage devices or overwriting magnetic disk drives with patterns. However, these methods may not be used in modern storage technologies. For example, deleting flash memory by overwriting will not work when wear leveling is applied to enhance the storage mediums lifetime. This is because wear leveling will have the effect that an overwriting operation will not affect the existing data intended to be deleted but rather will cause the writing to a new block. To address this problem, solid state devices (SSD) sometimes provide firmware commands for secure deletion of an entire hard drive. However, such deletion will only work on one entire physical disk and not on the file/object level. As another example, overwriting of content on a file system or blocks on a storage device will not work in modern storage infrastructure due to intelligent caching, archiving and/or virtualization.

Consequently, there is an unchanged need for improvements in solutions for data accessibility lifetime management and secure data deletion.

SUMMARY OF THE INVENTION

The term "hardware security module", as used herein, shall extend to any physical computing device that safeguards and manages digital keys for strong authentication and provides crypto processing without revealing decrypted data. In particular, the term hardware security modules shall include FIPS 140-1 and 140-2 certified products. Hardware security modules may come in the form of a plug-in card or an external security device that can be attached directly to a server or general purpose computer through a network or universal serial bus (USB) connection. A hardware security module may contain one or more secure crypto processor chips to prevent tampering and bus probing. Hardware security modules may be also deployed in the form of network hardware security modules to manage transparent data encryption keys associated with some databases.

The term "data storage medium", as used herein, shall extend to any physical device allowing retrieval of formerly stored data as, for example, EPROM, EEPROM, PROM, DVD-RAM, DVD±RW, CD-RW, Flash Memory, SSD (Solid State Devices), HDD (Hard Disk Drives), Magnetic Tapes, DAT (Digital Audio Tape), MO (Magneto Optical Devices), Mini Disc™.

The term "data object", as used herein, shall encompass any kind of finite digital data aggregate which may be serve as plain-text or cipher-text in an encryption/decryption operation as, for example, portions of streams, files and serialized objects. The term "data objects" shall relate to the broadest understanding of finite digital data aggregates and shall not imply any purpose, layout or structure.

The term "reference", as used herein, shall encompass a specific purpose data object encoding a machine readable descriptor of a storage location containing another (referenced) data object. The reference may be of the direct or indirect type in the sense of allowing direct or indirect access to the referenced data object. Direct references are known as, by example, pointers which identify memory locations or storage blocks in native addressing or numbering. Indirect references are known as, for example, primary keys, handles, unique identifiers, universally unique identifiers (UUID) and globally unique identifiers (GUID). Indirect references may not be directly used for access. Instead the indirect reference has to be resolved into a native identifier by means of a mapping table or deferring method call, for example.

The term "hierarchical data structure" shall relate to a collection of specific data objects, a number thereof comprising references to other data objects in the collection thereby allowing access to one or more other data objects by resolution along a chain of references. A more specific hierarchical data structure is known as "rooted tree" wherein all data objects are accessible along chains of references starting a single data object called "root node".

The term "encryption", as used herein, shall encompass applying any kind of known symmetric or asymmetric cipher method to plain-text input data for getting a non-plain-text readable (cipher text) representation as an output.

The term "decryption", as used herein, shall encompass applying any kind of known symmetric or asymmetric cipher method to cipher-text input data for getting a plain-text readable representation as an output.

The term "re-encryption", as used herein, shall have the meaning of changing from one cipher-text representation of data to another cipher-text representation. In particular, re-encryption may be performed by decryption of the initial cipher-text representation into plain-text by using a first cryptographic key and afterwards encryption of the plain-text for decryption with a different cryptographic key.

The term "cipher operation", as used herein, shall encompass any type of calculation which may not be derived or reconstructed from observation of its output other than in a complete search as, for example, encryption, decryption, re-encryption, secure hashing and secure random key generation.

The term "individually encrypted objects", as used herein, shall have the meaning that cipher-text representations located in different storage elements necessarily need to be decrypted with different cryptographic keys. Beyond this, the term "individually encrypted" shall also assume that knowledge of one cryptographic key does not divulge any information on other cryptographic keys. This implies that there is no information shared by any two keys. In a particular implementation, the cryptographic keys may be securely pairwise different as, for example, keys generated in a real or cryptographically secure randomly number generator are expected to be.

The term "obsolete cryptographic keys", as used herein, shall relate to cryptographic keys being no longer suitable for decryption due to re-encryption of the respective ciphertext data.

A first principal embodiment comprises a data processing and storage apparatus having a data storage medium and a hardware security module, the hardware security module having an internal storage for securely storing a master cryptographic key, the data storage medium being configured for storing a number of individually encrypted data objects and a data maintenance structure comprising an number of individually encrypted partition tables and individually encrypted hash-nodes, the encrypted partition tables and the encrypted hash-nodes forming a hierarchical data structure via a rooted tree, wherein:
- a given partition table of the partition tables comprises a first reference assigning a given encrypted data object of the encrypted data objects to the given partition table, wherein the given partition table further comprises a first cryptographic key being suitable for decryption of the given encrypted data object;
- a given hash-node of the hash-nodes comprises a second reference assigning one of the encrypted partition tables or one of the hash-nodes to the given hash-node, wherein the given hash-node comprises a second cryptographic key being suitable for decryption of the one of the encrypted partition tables or one of the hash-nodes assigned to the given hash node via the second reference;
- the root node of the rooted tree is decipherable using the master cryptographic key, the given data object being assigned to the root node via the first and second references of the given partition table and the given hash-nodes, wherein the given partition table and the given hash-nodes form a first set of successive nodes in the tree; and wherein the data processing and storage apparatus comprises an application program, the application program being operable for receiving an instruction for deleting the given data object, wherein the application program is further operable in response to receiving the instruction for deleting the given data object by:
- traversing the first set of successive nodes in the tree by successively decrypting all hash-nodes and the partition table starting from the root node using the second cryptographic keys obtained by decrypting each of the nodes; and
- recursively traversing the first set of successive nodes starting from the partition table and re-encrypting all the recursively traversed nodes with new second cryptographic keys, whereby the first cryptographic key is removed from the partition table or disregarded in the re-encryption of the partition table.

This may allow to advantageously overcome limitations of typical hardware security modules and tamperproof crypto hardware as, for example limited computing power and limited memory capacity. Typical scaling requirement in hardware security module performance respective to storage throughput may be overcome. Upgrading of the hardware security module in course of storage extension may be avoided. In particular, the embodiment may help to raise the level of security in existing storage system at economic cost rate.

In a more detailed embodiment, the data processing and storage apparatus has a non-volatile re-writable storage medium.

In another more detailed embodiment of the data processing and storage apparatus the hash-nodes and the partition tables have the references and cryptographic keys organized in pairwise associations.

In another more detailed embodiment of the data processing and storage apparatus the hardware security module is configured to erase a master cryptographic key for making data objects stored in the data storage medium (irrevocably) undecryptable and thus plain-text inaccessible.

In another more detailed embodiment of the data processing and storage apparatus exactly one hash-node is decipherable by an operation of the hardware security module using one internally stored master cryptographic key.

In another more detailed embodiment of the data processing and storage apparatus is configured for marking the storage location containing the plain-text inaccessible data object as reusable.

In another more detailed embodiment, the data processing and storage apparatus is configured for adding a new data object to the data storage medium by:
- encrypting the new data object with a new first cryptographic key,
- storing the encrypted new data object on the data storage medium for assigning the new data object to the root node via the first and second references of the given partition table and the given hash-nodes;
- traversing the first set of successive nodes in the tree by successively decrypting all hash-nodes and the partition table starting from the root node using the second cryptographic keys obtained by decrypting each of the nodes;
- adding a further first reference and the new first cryptographic key to the given partition table, the further first reference assigning the encrypted new data object to the given partition table; and
- re-encrypting with the given partition table with a third cryptographic key.

For example, the third cryptographic key is a new second cryptographic key or the third cryptographic key is given by the second cryptographic key of the given partition table.

In another more detailed embodiment, a data processing and storage apparatus is further configured for recursively traversing the first set of successive nodes starting from the given partition table thereby re-encrypting all said recursively traversed nodes with new second cryptographic keys.

In another more detailed embodiment, a data processing and storage apparatus is further configured for recursively traversing the first set of successive nodes starting from the given partition table and re-encrypting all said recursively traversed nodes with their respective second cryptographic keys, wherein the third cryptographic key corresponds to the second cryptographic key of the given partition table.

In another more detailed embodiment, the data processing and storage apparatus is further configured for rebalancing the data maintenance structure of the hash-nodes and the partition tables thereby distributing data from a source hash-node of the given hash-nodes or the given partition table to a target hash-node of the hash nodes or a target partition-table of the partition tables, the source hash node or the given partition table being assigned to the root node via the second references of the given hash-nodes, wherein the given partition table and the given hash-nodes form a second set of successive nodes in the tree, the target hash node or the target partition table being assigned to the root node via the second references of the given hash-nodes, wherein the target partition table and the given hash-nodes form a third set of successive nodes in the tree, the apparatus being configured for performing the rebalancing, the rebalancing comprising:

traversing the second set of successive nodes in the tree by successively decrypting all nodes starting from the root node using the second cryptographic keys obtained by decrypting each of the nodes, the traversing resulting in a decrypted given partition table or decrypted source hash-node;

traversing the third set of successive nodes in the tree by successively decrypting all hash-nodes and the partition table starting from the root node using the second cryptographic keys obtained by decrypting each of the nodes, the traversing resulting in a decrypted target partition table or decrypted target hash-node;

adding at least a part of the references and cryptographic keys comprised in the decrypted given partition table or decrypted source hash-node to the decrypted target partition table or decrypted target hash-node removing the moved part from the respective decrypted given partition table or decrypted source hash-node, recursively traversing the second set of successive nodes starting from the given partition table or the source hash-node and re-encrypting all the recursively traversed nodes with new second cryptographic keys and recursively traversing the third set of successive nodes starting from the target partition table or the target hash-node and re-encrypting all the recursively traversed nodes with new second cryptographic keys.

This rebalancing advantageously allows limiting the size of the partition tables to the capacity of internal storage in the hardware security module without degradation in overall data object storage capacity.

In another more detailed embodiment of the data processing and storage apparatus, each data object has a unique identifier (UUID) assigned to.

In another more detailed embodiment of the data processing and storage apparatus, the given hash-node of the hash-nodes has associated a hash-function description, the hash-function description providing a mapping of the unique identifier to the second reference assigning one of the encrypted partition tables or one of the hash-nodes to the given hash-node.

This may have the advantage that by knowledge of the unique identifier of a data object, traversing of the set of nodes can be performed in a directed manner. For example, each time a node is decrypted, the next second reference is selected by applying a hash-function according to the hash-function description contained in that node to the unique identifier.

In another more detailed embodiment, the data processing and storage apparatus has the rebalancing operation further comprising replacing the hash-function description in the source hash-node and the target hash node in order to reflect the change in the cardinality of the set of second references comprised in these hash-nodes.

In another more detailed embodiment of the data processing and storage apparatus, the hardware security module is configured for performing all kind of cipher operation during data object storage, retrieval or deletion without storing cryptographic keys or plain-text data objects to the data storage medium.

This may be useful when increasing the level of security in data deletion is primarily targeted.

In another more detailed embodiment of the data processing and storage apparatus, the hardware security module is configured for performing the decryption and encryption thereby confining the master cryptographic key and the first cryptographic keys and the second cryptographic keys and any decrypted plain-text representation of data objects involved in the decryption or encryption operation to the internal storage.

This may be useful as providing for a good tradeoff between security in data deletion and storage bandwidth/throughput.

In another more detailed embodiment of the data processing and storage apparatus, the further processing means comprises a processor and a volatile memory.

In another more detailed embodiment of the data processing and storage apparatus, the hardware security module is configured for:

exclusively performing the encryption and the decryption operations in case the encryption and decryption operations are purely performed using the master cryptographic key stored in the internal storage; and performing the encryption and the decryption operations on a first portion of the data readable from the data storage medium, whereby further processing means are configured to execute the encryption and the decryption operations on a second portion of the data readable from the data storage medium.

In another more detailed embodiment of the data processing and storage apparatus, the hardware security module is configured to perform the encryption and decryption operation on the data readable from the data storage medium to the extent of encryption and decryption and re-encryption of the first and second cryptographic keys only. Thus, the computing resources are exclusively reserved for retrieval of cryptographic keys. The encryption and decryption of data objects which may be rather computing resource consuming may be dedicated to a further special crypto module.

In another more detailed embodiment of the data processing and storage apparatus, the hardware security module is configured to perform the encryption and decryption operation on the data readable from the data storage medium to the extent of encryption and decryption and re-encryption of the hash-nodes and partition tables only. In such situation, the hardware security module may be configured to perform encryption and decryption and re-encryption during traversal of the first, second and/or third set of tree nodes in a streaming operation along the successive nodes thereby temporarily storing the cryptographic keys in the internal storage.

In another more detailed embodiment of the data processing and storage apparatus, the hardware security module is configured to perform the encryption and decryption operation on the data readable from the data storage medium to the extent of encryption, decryption and re-encryption of the hash-nodes and the partition tables only.

In another more detailed embodiment of the data processing and storage apparatus, the hardware security module is configured for creating a public-private-key pair for asymmetric encryption of the data objects, embedding the private key as the first cryptographic key into the partition table and providing the public key to the further processing means for use in the data object encryption and storage operations.

This may be useful in obtaining a good storage bandwidth/throughput at highest security level in archiving applications without considerable amount of data retrieval and/or individual deletion operations.

In another principal embodiment, the deletion of content in digital storage systems comprises a method for deleting a data object using a data processing and storage apparatus having a data storage medium and a hardware security module, the hardware security module having an internal storage for securely storing a master cryptographic key, whereby the data storage medium is configured for storing a number of individually encrypted data objects and a data maintenance structure comprising an number of individually encrypted partition tables and individually encrypted hash-nodes, the encrypted partition tables and the encrypted hash-nodes forming a hierarchical data structure via a rooted tree, wherein:

a given partition table of the partition tables comprises a first reference assigning a given encrypted data object of the encrypted data objects to the given partition table, wherein the given partition table further comprises a first cryptographic key being suitable for decryption of the given encrypted data object;

a given hash-node of the hash-nodes comprises a second reference assigning one of the encrypted partition tables or one of the hash-nodes to the given hash-node, wherein the given hash-node comprises a second cryptographic key being suitable for decryption of the one of the encrypted partition tables or one of the hash-nodes assigned to the given hash node via the second reference; and  the root node of the rooted tree is decipherable using the master cryptographic key, the given data object being assigned to the root node via the first and second references of the given partition table and the given hash-nodes, wherein the given partition table and the given hash-nodes form a first set of successive nodes in the tree;

wherein the method comprises receiving by an application program of the data processing and storage apparatus an instruction for deleting the given data object, and in response to receiving the instruction for deleting the given data object  traversing the first set of successive nodes in the tree by successively decrypting all hash-nodes and the partition table starting from the root node using the second cryptographic keys obtained by decrypting each of the nodes,  recursively traversing the first set of successive nodes starting from the partition table and re-encrypting all the recursively traversed nodes with new second cryptographic keys, whereby the first cryptographic key is removed from the partition table or disregarded in the re-encryption of the partition table.

In another principal embodiment, the deletion of content in digital storage systems includes a computer readable non-transitory storage medium comprising computer readable instructions.

The above-described data processing apparatus and operation methods may be implemented in digital electronic circuitry, in computer hardware, firmware, and/or software. The implementation may, for example, be a programmable processor, a computer, and/or multiple computers.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

BRIEF DESCRIPTIONS OF THE DRAWINGS

Examples are described with reference to the attached drawings, in which.

DETAILED DESCRIPTION

In the light of the subsequent explanations numerous advantages of the summarized concepts will become apparent. In particular, the layout of the data maintenance structure stored in the data storage medium allows the use of the hardware security module to be limited to a small number of operations during typical data object access, insertion or deletion operations. A considerable amount of computational load due to cipher operation may be shifted to an additional processing means which, for example, may be designed for scalable performance at low costs. In a specific situation, the proposed data layout may be used with an asymmetric encryption/decryption algorithm thereby allowing encryption of all data objects to be performed in unsafe hardware, i.e. outside the hardware security module, without any negative impact on security. This specific approach may be very useful in "one-way" data storage as, for example, data archiving, data tracking or transaction logging where later need for accessing stored data is typically rather unlikely.

Figure 1:
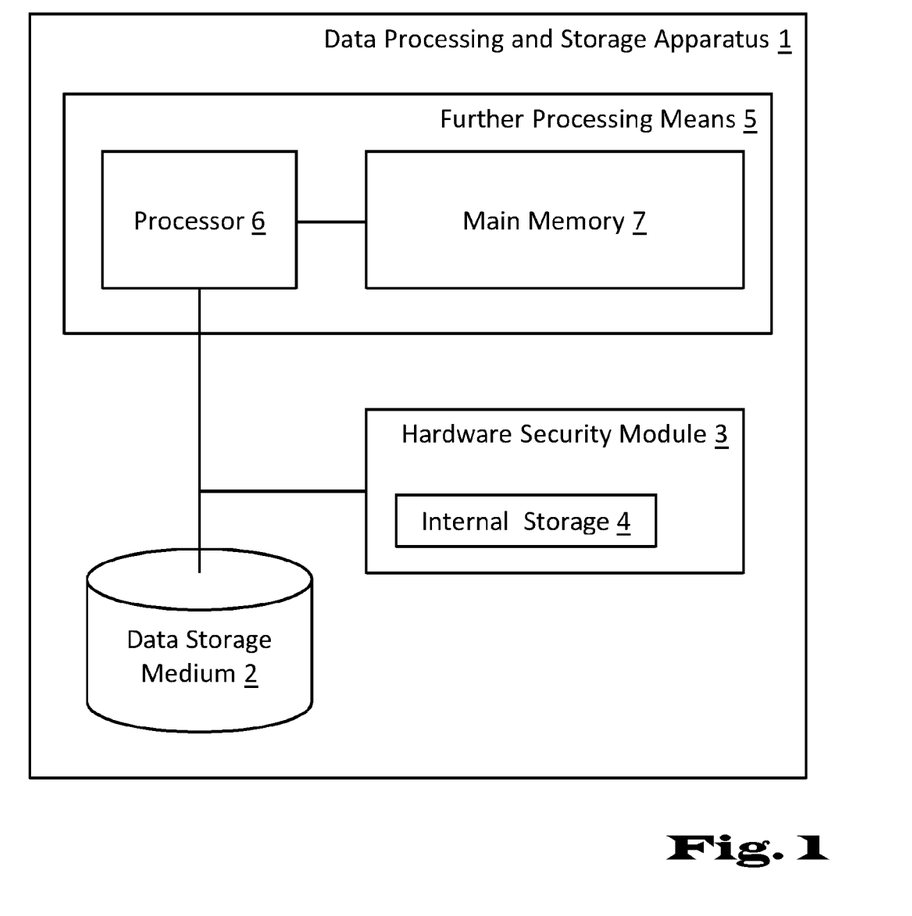
FIG. 1 schematically illustrates an exemplary data processing and storage apparatus.

FIG. 1 schematically shows an example of a data processing and storage apparatus 1. The exemplary data processing and storage apparatus 1 comprises a data storage medium 2. In instances, the data storage medium 2 is a non-volatile storage medium thereby maintaining its internal state in case of power shutdown or the like. The data processing and storage apparatus 1 may also comprise a hardware security module 3, in instances. The hardware security module 3 may be configured to provide for tamperproof cipher functionality.

For this sake, the hardware security module 3 may comprise an internal storage 4 for storing a portion of secret data as, for example, a number of master cryptographic keys used or to be used for encryption or decryption. The hardware security module 3 may be implemented in hardware in a way making any external access to the secret data in the internal storage 4 impossible. In instances, the hardware security module 3 may be configured to provide for the creation of master cryptographic keys only, whereby master cryptographic key reading operation may not be supported. In a more elaborated example, the hardware security module 3 may be configured to create and store master cryptographic key using secure random number generation.

In instances, the hardware security module 3 may provide for functionality allowing the user to directly replace a master cryptographic key internally stored by newly created random master cryptographic key. In such situation, a master cryptographic key previously stored in the internal storage may become unrecoverable lost thereby making it impossible for anyone to gain access to the contents of cipher-text decipherable using this earlier master cryptographic key.

As another example, the hardware security module 3 may provide for functionality allowing re-encryption of a cipher-text portion contained in the data storage medium 2. Such re-encryption operation may, for example, include copying of the internally stored master cryptographic key to another (volatile) internal storage location 4, creating and storing new master cryptographic key at the internal storage, repeatedly copying portions of the cipher-text from the data storage medium 2 to an internal storage, decrypting the cipher-text to plain-text thereby maintaining the intermediate plain-text in internal storage, encrypting the intermediate plain-text by use of the new master cryptographic key and writing the resulting cipher-text to the data storage medium 2. After completion, the hardware security module 3 may delete the copy of the former master cryptographic key and the intermediate plain-text from the internal (volatile) storage.

In another example, the hardware security module 3 may be configured to autonomously perform encryption, decryption and re-encryption operations using master cryptographic keys stored in the internal storage 4. Preferably, the hardware security module 3 may be configured to read and write data to the data storage medium 3 directly without involvement of other devices. Then, the hardware security module 3 may be configured to perform encryption operation using an incoming plain-text data stream and internally stored master cryptographic key autonomously thereby writing the resulting cipher-text to the data storage medium 2 directly.

Similarly, respective to decryption operation, the hardware security module 3 may be configured to read cipher-text from the data storage medium 2 directly when performing decryption operation using the internally stored master cryptographic key thereby producing a stream of plain-text data as an output. In instances, measures may be taken to prevent the incoming/outgoing plain-text data streams from being copied. Such measures may include preventing the data processing and storage apparatus 1 from storing plain-text data in shared or non-volatile memory. As an example, the hardware security module 3 may be configured to perform all cipher operations in a tamperproof hardware unit.

In instances, the data processing and storage apparatus 1 may comprise a further processing means 5. In an example, such further processing means 5 may include a processor 6 having a main memory 7 attached to. The further processing means 5 may become helpful when the hardware security module 3 has to be relieved from performing cipher operations in large scale storage scenarios. Then, for example, a portion of cipher operations may be performed by the further processing means. Obviously, this portion may not include cipher operations using the master cryptographic key stored in the hardware security module 3 internally as such data may not be read out for security reasons as pointed out before.

In another example, cipher calculation may be allocated to the further processing means 5. In such situation, cipher operations performed by the hardware security module 3 may be limited to encryption and decryption operations using the master cryptographic key stored internally. Otherwise, as an alternative example, all cipher (decryption, encryption) operations may be allocated to the hardware security module 3 for enhancement in security. A tamper-proof implementation of the hardware security module 3 may be chosen in such situation to safeguard against plain-text data sniffing on hardware level. In instances, it may be chosen to adjust the allocation of cipher operation to the further processing means according to the actual system load. This might be useful for achieving a reasonable trade-off between security requirements and system performance at any time.

Figure 2:
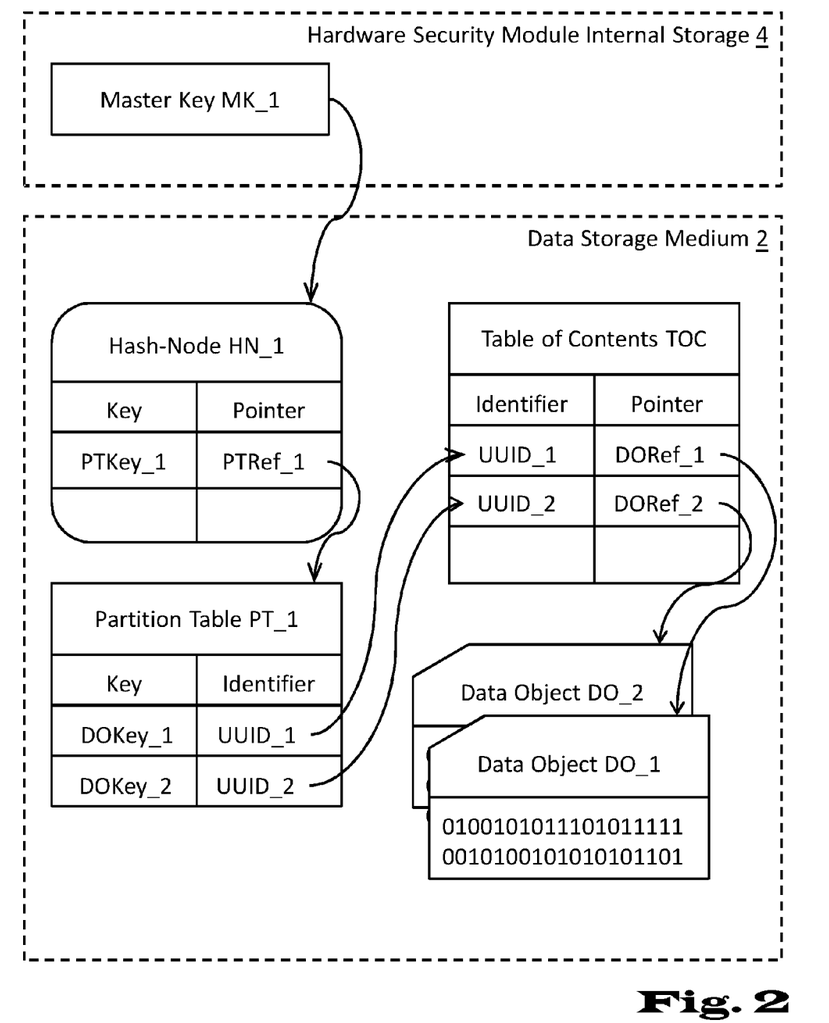
FIG. 2 schematically illustrates a snapshot of the storage inventory in an exemplary data processing and storage apparatus according to FIG. 1.

FIG. 2 schematically illustrates an exemplary snapshot on data inventory in the storage medium 2 and the internal storage 4 of the hardware security module 3 in an example of the data processing and storage apparatus 1 according to FIG. 1. The snapshot has been restricted to a rather straightforward situation for the sake of simplification and comprehensiveness. More complex situations may be constructed based thereon according to the operations for adding new data objects and balancing of the data maintenance structure as explained below with reference to FIGS. 3 and 4 respective.

Figure 3:
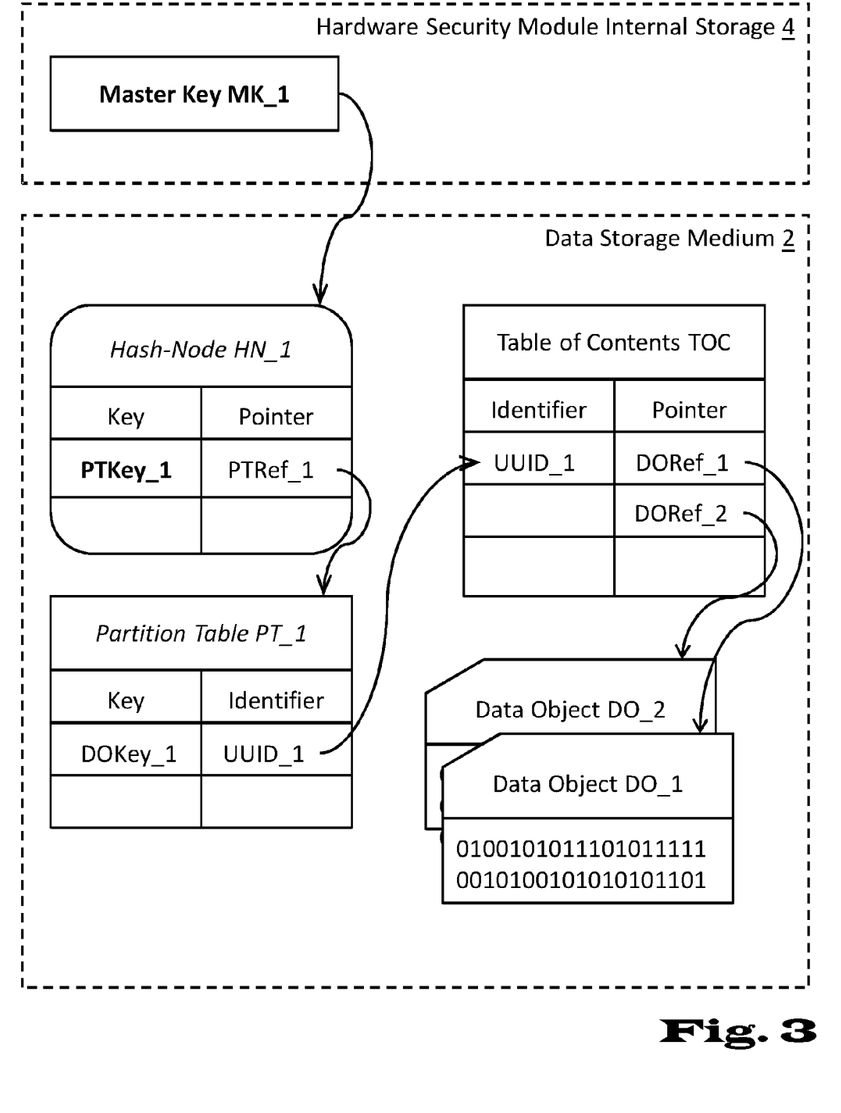
FIG. 3 schematically illustrates deletion of an individual data object in the storage inventory according to the snapshot of FIG. 2.
Figure 4:
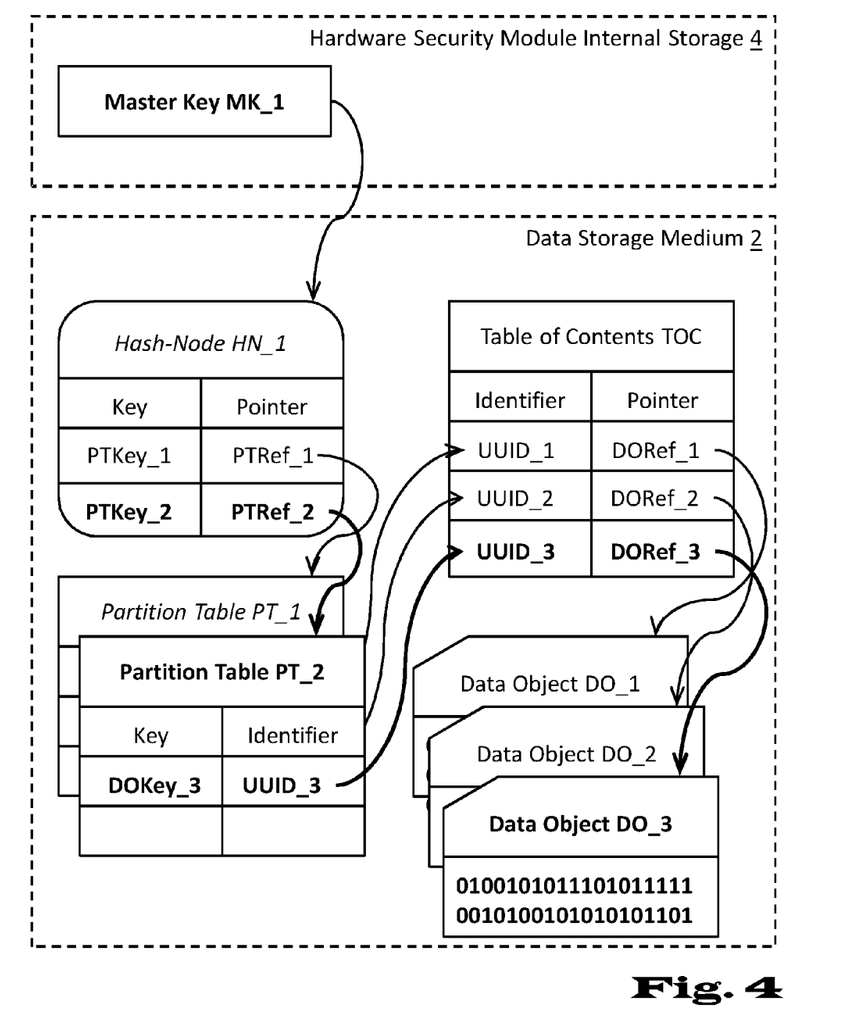
FIG. 4 schematically illustrates insertion of a new data object in the storage inventory according to the snapshot of FIG. 2.

Throughout snapshots in FIGS. 2, 3 and 4 symbols relating to data contained in the internal storage of the hardware security module 3 are shown in the upper broken line box whereas symbols relating to data contained in the data storage medium 2 will be found in the lower broken line box. In the following explanations no differentiation will be made between a stored data representation of an object and the object as an element in a logical data organization scheme.

In instances, the data storage medium 3 may contain a number of data objects which may be understood as the pay load portion of the data inventory. Data objects thereby may be thought as data aggregates of a fixed known length intended to be managed and manipulated in its entirety by the data processing and storage apparatus. For the sake of simplification, only two data objects DO_1, DO_2 are shown in the drawing.

Additionally, as a more detailed example, a table of contents TOC may be stored in the data storage medium 3 as part of the data maintenance structure. The table of contents TOC may hold a number of pairwise associations between unique identifiers and pointers to internal storage locations containing the respective data objects. The associations may be of the mapping type, thereby allowing direct retrieval of a pointer using a unique identifier. As an example, the table of contents TOC may contain unique identifiers UUID_1 and UUID_2 associated with the pointers DORef_1 and DORef_2 designating the storage locations holding cipher-text representations of data object DO_1 and DO_2, respectively. The table of contents TOC may hold a complete list of all data objects DO_1, DO_2 contained in the data storage medium 2. For the sake of uniqueness, the unique identifiers need to be pairwise different. In an example, the unique identifiers may be integral numbers constructed by successively enumerating the data objects during insertion.

The data objects DO_1, DO_2 are stored as individually encrypted representations. Individually encrypted thereby shall have the general meaning that knowledge of the cryptographic key suitable for decryption of a first data object does not divulge any information upon cryptographic keys suitable for decryption of other data objects. In the particular situation as shown, knowledge of the cryptographic key being suitable for decryption of the data object DO_1 does not divulge any information upon cryptographic key suitable for decryption of data object DO_2 and vice versa.

The cryptographic keys DOKey_1 and DOKey_2 suitable for decryption of the data objects DO_1 and DO_2, respective, shall be referred to as first cryptographic keys and may be collected or organized in the structure of a partition table PT_1. The partition table PT_1 may be understood as a data layout providing a number of slots to hold pairs of a first cryptographic key DOKey_1, DOKey_2 and a first reference to a data object DO_1, DO_2 which can be made plaintext accessible by performing a decryption operation using the respective first cryptographic key.

In instances, the first references to the data objects included in the partition table may be of the indirect type as, in the exemplary situation, the unique identifiers are. The partition table PT_1 itself may not be stored in a plain-text representation but rather in cipher-text representation to prevent from direct access to the embedded first cryptographic keys DOKey_1, DOKey_2. In instances, as shown in the exemplary situation, encryption of the partition table PT_1 may be performed on the entire data as a whole. Then, any access to data items within the partition table PT_1 as, for example the first cryptographic keys DOKey_1, DOKey_2, will require an overall decryption of the entire cipher-text. It may be considered as an advantage, that in such situation no portion of the partition table PT_1 would be recoverable unless the entire cipher-text becomes available for decryption. In instances, this may be an enhancement to data security because cipher-text fragments would not allow reconstruction of a plain-text portion even in a brute force attempt. However, corruption or loss of small data portions due to hardware failure might spread out and result in extended or even complete loss of plain-text accessibility to the partition table. Therefore, in alternatives, partition table data items, namely first references and first cryptographic keys, may be encrypted individually thereby leaving the structure of the partition table plain-text accessible in the data storage medium 3.

In instances, the data layout of the partition tables may be designed to provide for only a limited number of slots for the reason of improved performance. Limiting the number of slots may be desirous in practice to restrict the amount of data required for a plain-text representation of partition tables to the limited capacity of the internal storage of the hardware security module. This will allow encryption and decryption to be performed in the hardware security module by exclusively using the internal storage. In case of a limited number of slots, however, there will be no way to extend the number of slots dynamically at runtime. The exemplary situation assumes a limitation to two slots as the smallest non-trivial number suitable to collect multiple pairs of first references and first cryptographic keys. In practice there will be typically much more slots in partition tables. Additionally, as the number of stored data objects will be multiple times larger than the number of slots in the partition tables, there will be a large number of partition tables in a typical situation in practice.

In order to provide for a well-defined procedure for accessing the partition tables, the data maintenance structure, in instances, may additionally include a number of hash-nodes. Similar to the partition tables, as explained before, the hash-nodes may be designed to provide for a limited number of slots suitable for holding a number of pairs, each including a second cryptographic key and a second reference. In an example, the second references may be pointers directly identifying storage locations of encrypted partition tables whereas the cryptographic keys associated thereto in the pair relation are suitable for plain-text access to the respective partition table in plain-text. This situation is shown in the drawing. The pointer PTRef_1 identifies the storage location holding a cipher-text representation (encrypted version) of the partition table PT_1 whereby the second cryptographic key PTKey_1 may be used for plain-text access to the partition table PT_1 by decryption of the cipher-text at the respective storage location.

Preferably, the hash-nodes and partition tables may be arranged in referential relation forming a rooted tree. In the snapshot situation the single hash-node HN_1 may be understood as the root node, whereby the partition table PT_1 may be understood as the only leaf of the rooted tree. The directed edges of the rooted tree are implied by the second references included in the hash-node(s). The data objects DO_1, DO_2 are rather payload data than part of the overhead, namely the data maintenance structure, and will therefore not be considered as leafs in the rooted tree.

Again similar to the partition tables, the hash-nodes may, in instances, be encrypted as a whole. Then, access to any portion of the hash-node plain-text would require complete decryption of the stored cipher-text.

In instances, the internal storage 4 of the hardware security module 3 may contain a master cryptographic key MK_1 suitable to perform a decryption operation using an encrypted representation of a root hash-node in the rooted tree structure. In the exemplary situation, the hash-node HN_1, as being the root node in the rooted tree, may be made plain-text accessible by decryption operation using the master cryptographic key MK_1.

In a first exemplary alternative, the master cryptographic key MK_1 may include a symmetric cryptographic key to be used in a symmetric encryption and decryption algorithm as well. Then, the first hash-node HN_1 may be encrypted and decrypted by use of the master cryptographic key MK_1 in the same way. In an alternative, the master cryptographic key MK_1 may include the (private) cryptographic key to be used in a so-called public key algorithm. In such circumstances, the (public) encryption key formerly used for encryption of the root hash-node HN_1 may have been discarded after encryption. Use of asymmetric cryptography may be preferred when encryption operation has to be allocated to non-tamperproof hardware as, for example, to the further processing means 5 as explained before. Then, breaking the secret of the (public) encryption key would not facilitate an attempt to reconstruct the encrypted data or even the (private) cryptographic key for the well-known reasons.

In a further extension, the master cryptographic key MK_1 may have a pointer to the storage location of the first root hash-node HN_1 associated with for facilitating data retrieval. This may be useful, when multiple master cryptographic keys may be provided for the sake of multi-client capability, as will be explained below in more detail. However, no such reference or pointer associated with master cryptographic key MK_1 is shown in the drawing.

Any kind of plain-text access to the data objects DO_1, DO_2 requires a decryption operation using the master cryptographic key MK_1 as a first step. This can be seen as follows. Direct plain-text access to the data objects DO_1, DO2 is impossible due to their cipher-text storage representations. However, despite being embedded in the partition table PT_1, the respective first cryptographic keys DOKey_1, DOKey_2 cannot be extracted in plain-text unless the partition table PT_1 has been extracted in plaintext itself by another decryption operation. This, however, requires plain-text access to the second cryptographic key PTKey_1 which allows decryption of the partition table PT_1. According to the exemplary situation, the second cryptographic key PTKey_1 is embedded in first hash-node HN_1. As the first hash-node HN_1 is stored in a cipher-text representation as well, decryption is required before the embedded cryptographic key PTKey_1 becomes plain-text accessible. Therefore and finally, decryption of the first hash-node HN_1 requires a master cryptographic key MK_1 based decryption operation to be performed by the hardware security module 3. In a situation when the hardware security module 3 will not allow an external device reading access to the master cryptographic key MK_1, the decryption operation using the master cryptographic key MK_1 has to be performed by the hardware security module 3.

As pointed out before, plain-text access to any data object DO_1, DO_2, partition table PT_1 or hash-node HN_1 will always recur backwards along the chain of references embed in the data maintenance structure to a decryption operation using the master cryptographic key MK_1 and to be performed by the hardware security module 3. This may be understood in the sense of dependency.

As an obvious consequence, loss or erasure of a master cryptographic key will make the depending hash-nodes, partition tables and data objects becoming definitively and irrecoverably plain-text inaccessible. Accordingly, master cryptographic key erasure may be intentionally used for making dependent data objects irrevocably plain-text inaccessible at the same time, for example. In similar circumstances, storage of an unencrypted representation of the table of contents TOC as explained before may facilitate reuse of the space in the data storage medium 2 being allocated to the plain-text inaccessible data objects.

An effect very similar to erasure of a master cryptographic key will occur, when the data storage medium 2 is separated from the hardware security module 3 by malicious act as, for example, theft. In the same way, plain-text access to a backup or copy of the data storage medium will be impossible when separated from the hardware security module 3.

In another example, which not shown in the drawings, the data storage medium inventory may be extended to multi master cryptographic keys and a multiple data maintenance structure in order to provide for multi-client capability. In a very simple and exemplary implementation thereof, the inventory in data storage medium 2 and hardware security module internal storage 4, as shown in FIG. 2, may be duplicated to provide for separate access paths to separate data objects for two clients. In instances of such fundamental multi-client capability, all master cryptographic keys may be stored internally in the hardware security module 3 thereby making the decryption operation based thereon subject to an authentication to be executed by the respective client or client front-end system before plain-text access is granted. In a more detailed example, such authentication may include entering a password, providing a biometrical input, performing a smart card operation or the like.

In order to provide for access to the plain-text of a selected data object, the data processing and storage apparatus 1 may be configured, for example, to perform a kind of tree-search operation by successively decrypting hash-nodes and partition tables. In the exemplary situation, a plain-text access to data object DO_2 may be achieved by decrypting the first hash-node HN_1 using the master cryptographic key MK_1, following the (sole) embedded reference PTRef_1 to the partition table PT_1, decrypting the partition table PT_1 by using the second cryptographic key PTKey_1, searching through the embedded pairs for the required value of the unique identifier UUID_2, translating the unique identifier UUID_2 into a pointer DORef_2 to the storage location of the data object DO_2 by table of contents TOC lookup and decrypting the data object DO_2 by using the first cryptographic key DOKey_2. More elaborated approach will be explained subsequent in the context of an exemplary insertion and tree-balancing operation.

FIGS. 3 and 4 are provided for illustration of certain operations on the data inventory according to the snapshot given in FIG. 2. For a better understanding, the resulting changes have been highlighted. Data newly-inserted during the respective operation have bold letter labels. Hash-nodes and partition tables which have been altered only by re-encryption to another cipher-text representation have their respective titles written in italic. However, it should be understood that, in instances, re-encryption may result in a new storage object as resulting cipher-text may be stored as a new portion of data at a storage location which was formerly not used. This is a rather secondary effect.

FIG. 3 schematically illustrates a secure deletion operation executed with respect to a selected data object in the exemplary snapshot situation according to FIG. 2. The purpose of the deletion operation is to make the selected data object, namely data object DO_2, becoming definitive plain-text inaccessible without affecting accessibility for all other stored data objects, namely DO_1.

In an example, deletion may be requested by using the unique identifier UUID_2 for designating the selected data object DO_2 to be deleted. Then, deletion operation may comprise reconstruction of the plain-text of a partition table PT_1 having a pairwise association between the unique identifier UUID_2 and a first cryptographic key DOKey_2 suitable for decryption of the data object DO_2. In the example, such partition table PT_1 may be found by performing a searching operation similar to the tree searching operation as described before in the context of data retrieval. According to the assumption that data retrieval should be possible, there will be at least one partition table PT_1 comprising a first decryption DO2_Key key for plain-text access to the data object DO2.

In a next step, the deletion process may, for example, re-encrypt the partition table PT_1 in a way, which makes plain-text access subject to a decryption with a new second cryptographic key different from the second cryptographic key PTKey_1 stored in pairwise association with the reference PTRef_1 in hash-node HN_1 whereby the plain-text access shall not extend to the first cryptographic key DOKey_2. Again, the creation of the new cryptographic key PTKey_1 may be performed by the hardware security module 3 in a real or at least cryptographically secure random number generation algorithm.

In instances, the key DOKey_2 may be made plain-text inaccessible by leaving it out when copying the partition table PT_1 before encryption. In the drawing an empty slot is shown as a result thereof. In an alternative example, in a situation when the first cryptographic keys in the partition table have been encrypted separately, it may be sufficient to omit re-encryption of the first cryptographic key DOKey_2. However, this is not shown in the drawing.

Afterwards, the deletion process may continue by replacing the obsolete second cryptographic key PTKey_1 embedded in the hash-table HN_1 by the newly-created second cryptographic key. In instances, in a subsequent step, the deletion process may create a new master cryptographic key MK_1 and re-encrypt the hash-node HN_1 for making it plain-text accessible by use of the new master cryptographic key MK_1 only. Then the former master cryptographic key MK_1 will be replaced in the internal storage of the hardware security module by the newly-created master cryptographic key. Due to loss of former (obsolete) master cryptographic key MK_1 there will be no way for making the selected data object DO_2 plain-text accessible even if memory snapshots of the earlier data maintenance structure have been saved or copied.

If, in an example, a plain-text accessible table of contents TOC is provided, the respective unique identifier UUID_2 may be deleted to mark the storage of the selected data object DO_2 freed for reuse, as shown in the drawing. In such situation, the pointer may still serve for access to the storage location.

FIG. 4 schematically illustrates a new data object insertion operation in the exemplary snapshot situation according to FIG. 2. The exemplary insertion operation includes storing of a new data object to the data storage medium 2 and performing an update on the data maintenance structure in order to allow the new data object DO_3 being made plain-text accessible in the same way as explained before with regard to the data objects DO_1, DO_2.

The new data object is stored in an individually encrypted representation DO_3 such that plain-text access requires knowledge of a newly-created first cryptographic key DOKey_3. Again, the first cryptographic key DOKey_3 may be created by the hardware security module 3 in a real or at least cryptographically secure random number generation algorithm. Then, the first cryptographic key DOKey_3 may be stored in the data maintenance structure to provide for later plain-text access to the data object DO_3. Similar to the other first cryptographic keys DOKey_1 and DOKey_1, the new first cryptographic key DOKey_3 may be stored in a partition table. However, in the exemplary situation, the space provided for storing first cryptographic keys in the partition table PT_1 is exhausted.

In this situation, a prima-facie solution might be to extend the partition table. For improved performance, however, it may be advantageous for the insertion operation to include a rebalancing of the rooted tree by insertion of new partition table PT_2, as shown in the drawing. Then, the new first cryptographic key DOKey_3 may be filled into the first slot of the new partition table PT_2. Afterwards, a new cryptographic key PTKey_2 may be created and the new partition table PT_2 may be encrypted to a cipher-text representation which requires decryption operation using the new second cryptographic key PTKey_2 for plain-text access. Subsequent, the hash-node HN_1 may be updated by insertion of the new second cryptographic key PTKey_2 and a pointer PTRef_2 to the storage location of the new partition table PT_2 into an empty slot. Finally, in an example, the updated hash-node HN_1 may be re-encrypted for making plain-text access subject to a decryption using a newly-created master cryptographic key MK_1. It should be noted that no change has been made to the representation and contents of other partition tables, namely PT_1. At this point it should be noted, that from the viewpoint of security, there is no need for changing the master cryptographic key MK_1. Changing the master cryptographic key is only required for restricting accessibility to any stored data. Data insertion, however, does neither require nor imply any restriction with regard to accessibility of already stored data. Therefore, in an alternative example, the hash-node HN_1 may be re-encrypted for making plain-text access subject to a decryption using the unchanged master cryptographic key MK_1. It may be found as a general concept, that the cryptographic keys of existing hash-nodes and partition tables may be re-used in data insertion and data maintenance structure rebalancing operations. Reuse of existing keys may help to reduce load in the hardware security module due to time-consuming key generation.

In instances, when a hash-node holds second references to a number of partition tables, a hash-function may be used to spread access to data objects over these partition tables. In a more detailed example, a hash-function may be calculated using the unique identifiers associated to the data objects. In another more detailed example, the hash-function may be designed to achieve an equilibrated mapping of the identifiers to the partition tables. In just another more detailed situation, the hash-function may be chosen and/or parameterized using a hash-function descriptor stored in the respective hash-node. In similar instances, the hash-function descriptor may be used to fit the result set to the number of filled slots containing valid second references to partition tables. In a specific example, the hash-function may be chosen to be the least significant digit in a representation of the unique identifier as an integer value in the n-ary system, whereby "n" may be chosen as the number of filled slots in the hash-node. Then, the integral number of filled slots may be taken as the hash-function descriptor. For the sake of simplification, a hash-function descriptor has been omitted in the drawings as an implementation of a similar extension to the scheme presented before may be carried out in a straight forward manner.

In the exemplary situation, when adding further new data objects, the hash-node HN_1 will obviously have to be re-balanced in the same way as explained before with regard to the partition table PT_1. This may be, in instances, extended to a more general concept of balancing the rooted tree as follows. In a situation when adding a new pair of a second reference and a second cryptographic key to a selected hash-node fails due to limitation of the number of slots, this hash-node may be expanded into a sub-tree consisting of three new hash-nodes. One of these hash-nodes may be selected as the root node of this sub-tree thereby having second references and second cryptographic keys relating to the new two child hash-nodes filled into the slots. The second references and second cryptographic keys formerly stored in the old hash-node along with the second reference and the second cryptographic key to be added may be spread equally to the slots in the two new child hash-nodes of the sub-tree. In a situation when a hash-function is provided in the hash-node which has to be split, the hash-functions in the new hash-nodes may be adjusted accordingly to reflect the new situation. Alternatively, known approaches for balancing rooted trees may be used as, for example the Adelson-Velski-Landis (AVL) scheme and the red-black scheme.

Applying similar advanced approaches to rebalancing may yield benefits beyond merely avoiding degradation of data object storage capacity due to a limitation of partition table and/or hash-node size. In a specific situation, a well-balanced data maintenance structure may accelerate data object access, insertion and/or deletion operations. In another specific situation, a well-balanced data maintenance structure may improve storage efficiency by reducing the amount of storage required by the data maintenance structure in the data storage medium. As a consequence, rebalancing may be desired to occur not only in course of insertion of data objects but also in other circumstances. In a more detailed example, rebalancing may be performed after deletion of a predefined number of data objects. In another more detailed example, rebalancing may be performed periodically as a maintenance task.

What is claimed is:

1. A computer-implemented method of secure data deletion, comprising:
providing a master cryptographic key securely stored on an internal storage of a hardware security module of an apparatus;
providing a plurality of data objects individually encrypted and stored on a storage medium of the apparatus, the storage medium further storing a hierarchical data-maintenance structure comprising a tree having successive nodes including a root node, a plurality of hash-nodes, and a plurality of partition tables, the root node decipherable via the master cryptographic key;
responsive to receiving an instruction specifying to delete a first of the plurality of data objects, wherein the first object is assigned to a first of the partition tables, wherein the first object is decipherable via a first cryptographic key stored in the first partition table, traversing successive nodes in the tree by successively decrypting one or more of the plurality of hash-nodes, and the first partition table starting from the root node and using cryptographic keys obtained by decrypting each of the traversed nodes; and
recursively traversing and re-encrypting successive nodes starting from the first partition table and with new cryptographic keys, by operation of one or more computer processors, wherein the first cryptographic key is removed from the first partition table or disregarded in re-encrypting the first partition table, thereby effecting secure deletion of the first data object.

2. The computer-implemented method of claim 1, wherein the hardware security module is configured to exclusively perform any encryption involving the master cryptographic key stored in the internal storage.

3. The computer-implemented method of claim 1, wherein the hardware security module is configured to exclusively perform any decryption involving the master cryptographic key stored in the internal storage.

4. The computer-implemented method of claim 1, wherein the apparatus comprises a data processing and storage apparatus, wherein the storage medium comprises a data storage medium, wherein the apparatus includes an application program, wherein the successive nodes are recursively traversed by the application program, wherein each partition table and each hash-node is individually encrypted.

5. The computer-implemented method of claim 4, wherein the first partition table contains a first reference assigning the first data object to the first partition table, wherein the second partition table contains a second reference assigning the first partition table to the first hash-node, wherein the first data object is effectively assigned to the root node via the first and second references, wherein the first partition table and the first hash node form a first set of successive nodes in the tree.

6. The computer-implemented method of claim 5, further comprising:
rebalancing the hierarchical data-maintenance structure of the hash-nodes and the partition tables, thereby distributing data from a source hash-node of the hash-nodes or a source partition table of the partition tables to a target hash-node of the hash nodes or a target partition-table of the partition tables;
wherein the source hash node or the source partition table is assigned to the root node via hash-node references, wherein the source partition table and associated hash-nodes form a second set of successive nodes in the tree;
wherein the target hash node or the target partition table is assigned to the root node via hash-node references, wherein the target partition table and associated hash-nodes form a third set of successive nodes in the tree.

7. The computer-implemented method of claim 6, wherein rebalancing the hierarchical data-maintenance structure comprises, by the apparatus:
traversing the second set of successive nodes in the tree by successively decrypting all nodes starting from the root node using second cryptographic keys obtained by decrypting each of the nodes, thereby resulting in a decrypted source partition table or decrypted source hash-node; and
traversing the third set of successive nodes in the tree by successively decrypting all hash-nodes and the partition table starting from the root node using the second cryptographic keys obtained by decrypting each of the nodes, thereby resulting in a decrypted target partition table or decrypted target hash-node.

8. The computer-implemented method of claim 7, wherein rebalancing the hierarchical data-maintenance structure further comprises:
adding at least a part of the references and cryptographic keys comprised in the decrypted source partition table or decrypted source hash-node to the decrypted target partition table or decrypted target hash-node; and
removing the moved part from the respective decrypted given partition table or decrypted source hash-node.

9. The computer-implemented method of claim 8, wherein rebalancing the hierarchical data-maintenance structure further comprises:
recursively traversing and re-encrypting the second set of successive nodes starting from the source partition table or the source hash-node, and with new second cryptographic keys; and
recursively traversing and re-encrypting the third set of successive nodes starting from the target partition table or the target hash-node, and with new second cryptographic keys.

10. The computer-implemented method of claim 9, wherein each data object is assigned a unique identifier, wherein the first hash-node has an associated hash-function description that provides a mapping of the unique identifier to a reference assigning one of the partition tables or one of the hash-nodes to the first hash-node, wherein rebalancing the hierarchical data-maintenance structure further comprises:
replacing the hash-function description in each of the source and target hash-nodes in order to reflect a change in cardinality of references of the respective hash-node.

11. The computer-implemented method of claim 10, wherein the hardware security module is configured to perform encryption and decryption in a manner that confines the master cryptographic key and the first and second cryptographic keys and any decrypted plain-text representation of data objects involved in the decryption or encryption to the internal storage, wherein the hardware security module is configured to:
exclusively perform the encryption and decryption in case the encryption and decryption are purely performed using the master cryptographic key stored in the internal storage; and
perform the encryption and decryption on a first portion of data readable from the data storage medium, wherein the apparatus includes a further processing module configured to execute the encryption and decryption on a second portion of the data readable from the data storage medium.

12. The computer-implemented method of claim 11, wherein the hardware security module is configured to:
in a first instance, perform the encryption and decryption on the data readable from the data storage medium only to an extent of encrypting, decrypting, and re-encrypting the first and second cryptographic keys; and
in a second instance, perform the encryption and decryption on the data readable from the data storage medium only to an extent of encrypting, decrypting, and re-encrypting the hash-nodes and the partition tables;
wherein the hardware security module is configured to create a public-private-key pair for asymmetric encryption of the plurality of data objects, the public-private-key pair including a public key and a private key, wherein the private key is embedded into the first partition table as the first cryptographic key, wherein the public key is provided to the further processing module for use in data object encryption and storage.

13. The computer-implemented method of claim 12, further comprising adding a new data object to the data storage medium, wherein adding the new data object comprises:
encrypting the new data object with a new first cryptographic key;
storing the encrypted new data object on the data storage medium for assigning the new data object to the root node via the first and second references of the first partition table and the first hash-node;
traversing the first set of successive nodes in the tree by successively decrypting the first hash-node and the first partition table starting from the root node using the second cryptographic keys obtained by decrypting each of the nodes;
adding a further first reference and the new first cryptographic key to the first partition table, the further first reference assigning the encrypted new data object to the first partition table; and
re-encrypting the first partition table with a third cryptographic key.

14. The computer-implemented method of claim 13, wherein adding the new data object further comprises:
in a first given instance, recursively traversing the first set of successive nodes starting from the first partition table, thereby re-encrypting all the recursively traversed nodes with new second cryptographic keys; and
in a second given instance, recursively traversing the first set of successive nodes starting from the first partition table and re-encrypting all the recursively traversed nodes with respective second cryptographic keys, wherein the third cryptographic key corresponds to the second cryptographic key of the first partition table.

15. A non-transitory computer-readable medium containing a program executable to perform an operation for secure data deletion, the operation comprising:
providing a master cryptographic key securely stored on an internal storage of a hardware security module of an apparatus;
providing a plurality of data objects individually encrypted and stored on a storage medium of the apparatus, the storage medium further storing a hierarchical data-maintenance structure comprising a tree having successive nodes including a root node, a plurality of hash-nodes, and a plurality of partition tables, the root node decipherable via the master cryptographic key;
responsive to receiving an instruction specifying to delete a first of the plurality of data objects, wherein the first object is assigned to a first of the partition tables, wherein the first object is decipherable via a first cryptographic key stored in the first partition table, traversing successive nodes in the tree by successively decrypting one or more of the plurality of hash-nodes, and the first partition table starting from the root node and using cryptographic keys obtained by decrypting each of the traversed nodes; and
recursively traversing and re-encrypting successive nodes starting from the first partition table and with new cryptographic keys, by operation of one or more computer processors when executing the program, wherein the first cryptographic key is removed from the first partition table or disregarded in re-encrypting the first partition table, thereby effecting secure deletion of the first data object.

16. The non-transitory computer-readable medium of claim 15, wherein the hardware security module is configured to exclusively perform any encryption involving the master cryptographic key stored in the internal storage.

17. The non-transitory computer-readable medium of claim 15, wherein the hardware security module is configured to exclusively perform any decryption involving the master cryptographic key stored in the internal storage.

18. An apparatus for secure data deletion, comprising:
a hardware security module having one or more computer processors and an internal storage securely storing a master cryptographic key;
a storage medium storing a plurality of data objects that are individually encrypted, the storage medium further storing a hierarchical data-maintenance structure comprising a tree having successive nodes including a root node, a plurality of hash-nodes, and a plurality of partition tables, the root node decipherable via the master cryptographic key;
wherein the apparatus is configured to perform an operation comprising:
responsive to receiving an instruction specifying to delete a first of the plurality of data objects, wherein the first object is assigned to a first of the partition tables, wherein the first object is decipherable via a first cryptographic key stored in the first partition table, traversing successive nodes in the tree by successively decrypting one or more of the plurality of hash-nodes, and the first partition table starting from the root node and using cryptographic keys obtained by decrypting each of the traversed nodes; and
recursively traversing and re-encrypting successive nodes starting from the first partition table and with new cryptographic keys, wherein the first cryptographic key is removed from the first partition table or disregarded in re-encrypting the first partition table, thereby effecting secure deletion of the first data object.

19. The apparatus of claim 18, wherein the hardware security module is configured to exclusively perform any encryption involving the master cryptographic key stored in the internal storage.

20. The apparatus of claim 18, wherein the hardware security module is configured to exclusively perform any decryption involving the master cryptographic key stored in the internal storage.

\* \* \* \* \*